United States Patent
Woywod et al.

(10) Patent No.: US 6,742,851 B1
(45) Date of Patent: Jun. 1, 2004

(54) METHOD AND DEVICE FOR DETECTING A BRAKING SITUATION

(75) Inventors: Jürgen Woywod, Mörfelden (DE); Ralph Gronau, Wetter (DE); Georg Roll, Heusenstamm (DE); Dirk Waldbauer, Eppstein (DE)

(73) Assignee: Continental Teves AG & Co. OhG, Frankfurt (DE)

( * ) Notice: Subject to any disclaimer, the term of this patent is extended or adjusted under 35 U.S.C. 154(b) by 0 days.

(21) Appl. No.: 09/463,723
(22) PCT Filed: Jul. 29, 1998
(86) PCT No.: PCT/EP98/04725
§ 371 (c)(1),
(2), (4) Date: Apr. 28, 2000
(87) PCT Pub. No.: WO99/06256
PCT Pub. Date: Feb. 11, 1999

(30) Foreign Application Priority Data

Jul. 31, 1997 (DE) .......................................... 197 32 998

(51) Int. Cl.$^7$ ................................................ B60T 8/60
(52) U.S. Cl. ........................ 303/148; 303/149; 303/146; 303/DIG. 2
(58) Field of Search ................................ 303/146, 148, 303/149, 150, 176, DIG. 1, DIG. 2; 701/72, 73

(56) References Cited

U.S. PATENT DOCUMENTS

| | | | |
|---|---|---|---|
| 3,797,892 A | * | 3/1974 | Leiber .......................... 303/21 |
| 4,852,009 A | * | 7/1989 | Jonner et al. ........... 346/426.02 |
| 4,998,593 A | * | 3/1991 | Karnopp et al. ............ 180/140 |
| 5,134,352 A | * | 7/1992 | Matsumoto et al. ........ 318/587 |
| 5,328,255 A | * | 7/1994 | Isella .......................... 303/103 |
| 5,669,677 A | * | 9/1997 | Fischer ....................... 303/147 |
| 5,685,618 A | * | 11/1997 | Uchida et al. ............... 303/146 |
| 6,295,499 B1 | * | 9/2001 | Batistic ....................... 701/72 |

FOREIGN PATENT DOCUMENTS

| | | |
|---|---|---|
| DE | 39 19 347 | 2/1990 |
| DE | 39 12 014 | 10/1990 |
| DE | 39 35 588 | 4/1991 |
| DE | 39 39 069 | 5/1991 |
| DE | 41 09 522 | 9/1991 |
| DE | 41 12 284 | 10/1991 |
| DE | 42 08 404 | 9/1992 |
| DE | 4221030 | * 1/1994 |
| DE | 42 22 958 | 1/1994 |

(List continued on next page.)

OTHER PUBLICATIONS

Search Report of the German Patent Office for Application No. 197 32 998.5.
Zanten Van, A.: "FDR–Die Fahrdynamik–regelung von Bosch" ATZ, vol. 96, No. 11, 1994, p. 674–689.

*Primary Examiner*—Jack Lavinder
*Assistant Examiner*—Bradley King
(74) *Attorney, Agent, or Firm*—Rader, Fishman & Grauer PLLC

(57) ABSTRACT

A detection device for detecting braking of a vehicle during cornering on a road surface where the coefficient of friction of the road surface on a wheel on the outside of a curve is lower than on a wheel on the inside of the curve includes a comparison device for comparing the brake force or the brake force reduction of at least one wheel on the outside of a curve with the brake force or the brake force reduction of at least one wheel on the inside of the curve, and a device for generating a detection signal or initiating appropriate measures when the brake force of at least one wheel on the outside of a curve is lower or reduced to a greater degree than the brake force of at least one wheel on the inside of the curve. A device for influencing yaw torques has a so-called detection device and a reduction device which reduces the brake force in a brake of a wheel on the inside of a curve.

6 Claims, 2 Drawing Sheets

FOREIGN PATENT DOCUMENTS

| | | |
|---|---|---|
| DE | 195 22 632 | 1/1997 |
| DE | 195 45 001 | 6/1997 |
| DE | 196 07 050 | 8/1997 |
| DE | 197 03 668 | 8/1997 |
| EP | 0 733 530 | 9/1996 |
| EP | 0 771 707 | 5/1997 |
| EP | 0 844 155 | 5/1998 |
| WO | 91 04 891 | 4/1991 |

* cited by examiner

METHOD AND DEVICE FOR DETECTING A BRAKING SITUATION

TECHNICAL FIELD

The present invention relates to a method for controlling vehicle stability and more particularly relates to detecting and favorably influencing a defined driving situation in curves.

BACKGROUND OF THE INVENTION

FIG. 1 shows a road surface 10 on which a vehicle 11 drives in the direction of the arrow v which represents a certain vehicle speed v. The road surface has an inner area 10$i$ on which the inner wheels 12$i$ of the vehicle travel and an outer area 10$a$ on which the outer wheels 12$o$ of the vehicle 11 travel. The separation is indicated by the dotted line (which is not intended to be the center line of a road). During cornering, the outer wheels 12$o$ are usually subjected to greater load than the inner wheels 12$i$, because a rolling moment about the longitudinal axis of the vehicle is produced by the centrifugal force which is applied to the point of gravity of the vehicle situated above the road surface 10. The rolling moment must be compensated by an increased force on the outer wheels 12$o$. When braking in curves is so intensive that the anti-lock system (ABS) intervenes, the result is that due to the higher wheel load on the outside of a curve, the outer wheels 12$o$ usually experience a less potential or, at most, equally potential, braking pressure decrease compared to the respectively associated inner wheels 12$i$. Nevertheless, swerving of the vehicle has been encountered in critical operating conditions with ABS in such a fashion that the vehicle turns inwardly in a curve.

An object of the present invention is to provide a method and a device for detecting the above critical condition and a method and a device for favorably influencing the yaw torque in the above situation.

The case may occur that the coefficient of friction $\mu$ between wheel 12 and road surface 10 on outside road surface portions 10$o$ is lower than the coefficient of friction between the wheels 12$i$ on the inside of a curve and the road surface inner side 10$i$. This may cause an outer wheel 12$o$ to lock earlier than an inner wheel 12$i$ so that, accordingly, the ABS reduces the brake pressure $p_o$ for an outwardly disposed wheel 12$o$ to a greater extent than for an inwardly disposed wheel 12$i$ in order to prevent locking of the outer wheel. The result is that the brake force $F_o$ on the outer wheel is lower than the brake force $F_i$ on the inner wheel 12$i$. This generates a yaw torque $M_Y$ about the vertical axis of the vehicle which, different from the conventional case, is not opposed to the vehicle rotation that is already provided, but turns in the same direction so that there is the risk of the vehicle, induced by the yaw torque $M_Y$, beginning to turn inwards into the curve due to the higher brake force.

DETAILED DESCRIPTION OF THE PREFERRED EMBODIMENTS

Figure 1:
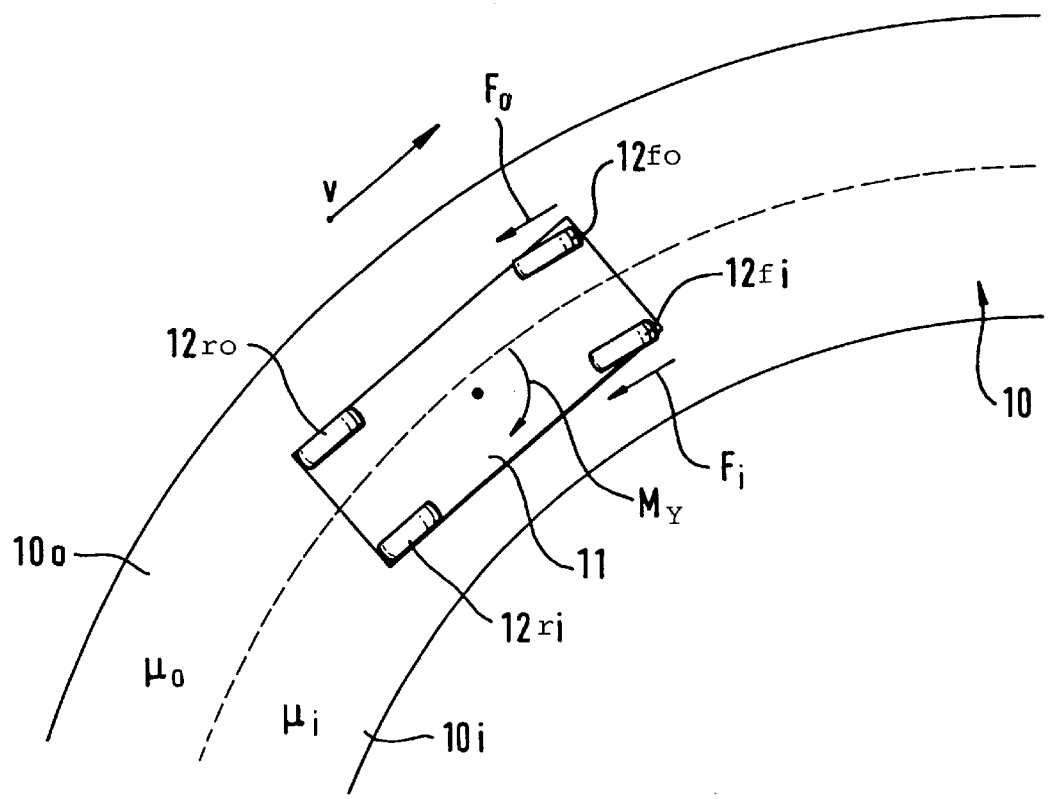
FIG. 1 is a view showing physical conditions as they may occur during braking in a curve.

According to the present invention, it is first determined whether cornering prevails and which wheels are the wheels on the inside of the curve and on the outside of the curve. This may be effected by a determining device 22 which can be configured, for example, as a steering angle sensor, a transverse acceleration sensing means, or a similar element. In the embodiment of FIG. 1, the determining device 22 would detect that the wheels 12$fi$ and 12$ri$, respectively, are the wheels on the inside of the curve and the wheels 12$fo$ and 12$ro$ are the wheels on the outside of the curve.

Figure 2:
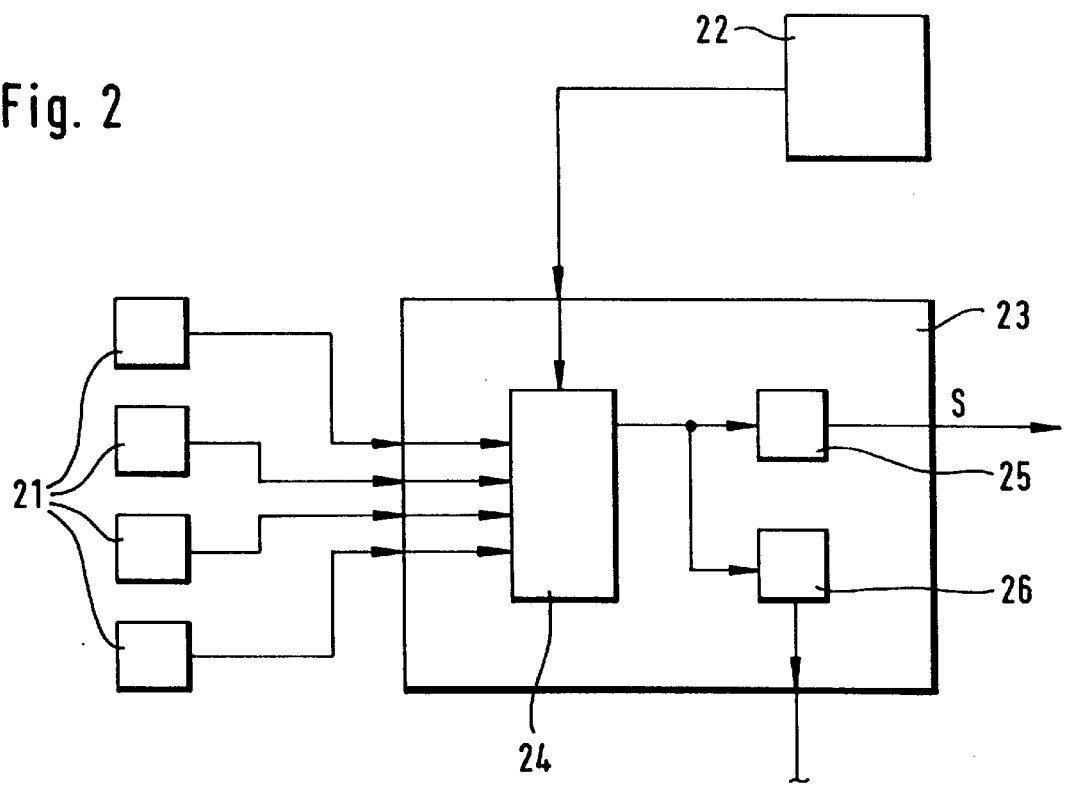
FIG. 2 is a view of an embodiment of a detection device according to the present invention.
Figure 3:
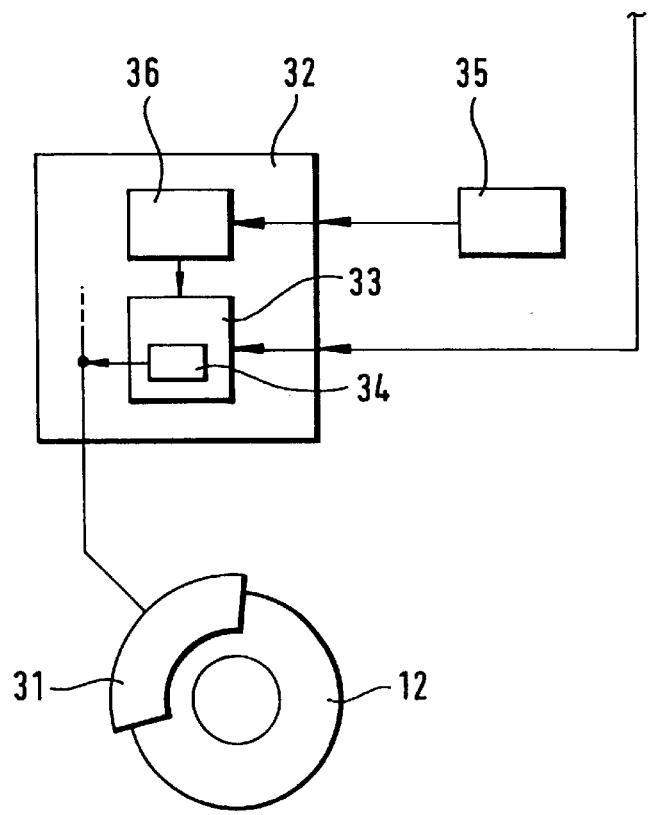
FIG. 3 is a view of an embodiment of an influencing device according to the present invention.

The brake force or, respectively, its reduction on at least one determined wheel on the outside of the curve is then compared with the brake force or, respectively, its reduction on at least one determined wheel on the inside of the curve. The signals for brake force or, respectively, its reduction which are necessary for the comparison can be produced in different ways. The embodiment of FIG. 2 shows a sensing device 21 which senses the braking pressures or their reductions for each wheel. Thus, the sensing device 21 can be comprised of sensors which measure the actually prevailing braking pressure in each one brake of a wheel. The sensing device 21 can also be a means tapping defined signals from an ABS system or a brake assistant. The sensing device 21 can also sense other physical quantities which are an indicator of the brake force of the wheels 12 under review.

It may happen in the above-mentioned comparison that, due to the intervention of ABS, the brake force on a wheel 12$o$ on the outside of a curve is lower or is decreased to a greater degree than the brake force on a wheel 12$i$ which is on the inside of the curve. This case is an indication of the above described critical situation so that, upon detection thereof, a detection signal S is issued or appropriate countermeasures are triggered. This can be done by suitable generating means 25, 26.

Because the critical situation described hereinabove (ABS intervention during braking when cornering with a lower coefficient of friction on the outside) of a curve leads to a yaw torque $M_Y$ about the vertical vehicle axis with a curve-inwardly directed turn, an appropriate countermeasure is to reduce the brake force on the wheel 12$i$ which is on the inside of the curve. This reduces the decelerating force $F_i$ on the vehicle inner side so that the yaw torque $M_Y$ which causes a curve-inwardly directed turn also decreases and the risk of the vehicle turning to the inside of a curve is diminished, or the yaw torque is even eliminated.

Decreasing the brake force on a curve-inward wheel 12$i$ can be effected by reducing or decreasing the braking pressure $p_i$ in the brake 31 of this wheel 12$i$. This may be done in a reduction device 33. Preferably, the brake force is so reduced that the brake force gradient or the variation per time unit remains below a value which is determined or determinable as a function of operating conditions of the vehicle. This can be ensured by a limiting device 34.

Further, braking pressure decrease can be bypassed when driving through only slight curves. This shows in a low transverse acceleration (due to the centrifugal force and the vehicle mass). Thus, a sensing device 35 for sensing the transverse acceleration of the vehicle can be provided as well as a prevention device 36 which prevents the reduction of the brake force when the transverse acceleration is below a determined or determinable value.

So far, methods and devices have been described wherein the prevention device 36 is provided in the yaw torque influencing device. However, the prevention device may also be included in the detection device and suppress a corresponding detection signal or the triggering of countermeasures. The same applies to the associated methods.

In the comparison of the detection method according to the present invention, preferably, the values of the wheels on one axle, more particularly the wheels 12f on the front axle, are compared with one another. The intervention for influencing the yaw torque is preferably carried out on the front inner wheel 12fi. The comparison according to the present invention can also be made in parallel for both axles, and the measures described above will only be taken if the criterion described hereinabove prevails on both axles.

What is claimed is:

1. Method of detecting braking of a vehicle during cornering on a road surface where the coefficient of friction of the road surface on a wheel on the outside of a curve is lower than on a wheel on the inside of the curve, comprising the steps of:
   A. sensing a brake pressure in a brake of at least one left wheel and at least one right wheel,
   B. determining at least one wheel on an outside of a curve and at least one wheel on an inside of the curve,
   C. comparing a signal representative of a brake force of the at least one wheel on the outside of the curve with a signal representative of a brake force of the at least one wheel on the inside of the curve,
   D. generating a detection signal when the brake force of at least one wheel on the outside of a curve is lower than the brake force of at least one wheel on the inside of the curve, the at least one wheel on the inside of the curve being on a same axle as the at least one wheel on the outside of the curve, and
   E. reducing the brake force in the brake of only the at least one wheel on the inside of a curve that is on the same axle as the at least one wheel on the outside of the curve in response to the detection signal.

2. Detection device for detecting braking of a vehicle during cornering on a road surface where the coefficient of friction of the road surface on a wheel on the outside of a curve is lower than on a wheel on the inside of the curve, comprising:
   a first sensing device for sensing a brake pressure in a brake of at least one left wheel and at least one right wheel,
   a determining device for determining at least one wheel on an outside of a curve and at least one wheel on an inside of the curve,
   a comparison device for comparing a brake force of the at least one wheel on the outside of a curve with a brake force of the at least one wheel on the inside of the curve,
   a generating device for generating a detection signal when the brake force of the at least one wheel on the outside of a curve is lower than the brake force of the at least one wheel on the inside of the curve, the at least one wheel on the outside of the curve being on a same axle as the at least one wheel on the inside of the curve, and
   a reduction device for reducing the brake force in the brake of only the at least one wheel on the inside of a curve that is on the same axle as the at least one wheel on the outside of the curve in response to the detection signal.

3. Device for influencing a yaw torque by influencing a brake force of a brake of at least one wheel of a vehicle, comprising:
   a detection device for generating a detection signal when a brake force of at least one wheel on an outside of a curve is lower than a brake force of at least one wheel on an inside of the curve, the at least one wheel on the outside of the curve being on a same axle as the at least one wheel on the inside of the curve, and
   a reduction device for reducing the brake force in a brake of only the at least one wheel on the inside of a curve and on the same axle as the at least one wheel on the outside of the curve in response to the detection signal.

4. Device as claimed in claim 3, wherein the reduction device reduces the brake force for the front wheel on the inside of a curve.

5. Device as claimed in claim 3, further including a limiting device which keeps a magnitude of a brake force gradient below a determined value.

6. Device as claimed in claim 3, further including
   a second sensing device for sensing a transverse acceleration of the vehicle, and
   a prevention device which prevents the reduction of the brake force when the transverse acceleration is below a determined value.

* * * * *